(12) United States Patent
Wen et al.

(10) Patent No.: US 7,885,960 B2
(45) Date of Patent: Feb. 8, 2011

(54) COMMUNITY MINING BASED ON CORE OBJECTS AND AFFILIATED OBJECTS

(75) Inventors: Ji-Rong Wen, Beijing (CN); Wen-Jun Zhou, Shanghai (CN); Wei-Ying Ma, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 10/624,759

(22) Filed: Jul. 22, 2003

(65) Prior Publication Data

US 2005/0021531 A1    Jan. 27, 2005

(51) Int. Cl.
G06F 17/30 (2006.01)
G06F 7/00 (2006.01)

(52) U.S. Cl. .................. 707/737; 707/748; 707/752; 707/754; 707/756

(58) Field of Classification Search ............... 707/1–10, 707/100–104.1
See application file for complete search history.

(56) References Cited

U.S. PATENT DOCUMENTS

| | | | | |
|---|---|---|---|---|
| 6,349,296 | B1* | 2/2002 | Broder et al. .................. | 707/3 |
| 6,457,028 | B1* | 9/2002 | Pitkow et al. ............... | 715/513 |
| 6,564,206 | B1* | 5/2003 | Ikeda ........................... | 707/3 |
| 6,886,129 | B1* | 4/2005 | Raghavan et al. ........ | 715/501.1 |
| 6,996,577 | B1* | 2/2006 | Kiran et al. ............. | 707/103 R |
| 2002/0152222 | A1* | 10/2002 | Holbrook ................. | 707/104.1 |
| 2003/0041054 | A1* | 2/2003 | Mao et al. ..................... | 707/3 |
| 2006/0031246 | A1* | 2/2006 | Grayson ..................... | 707/102 |

OTHER PUBLICATIONS

Jon M. Kleinberg, "Authoritative Sources in a Hyperlinked Environment," Proceedings of the ACM-SIAM Symposium on Discrete Algorithms, 1998, pp. 668-677.

Alexandrin Popescul, Gary William Flake, Steve Lawrence, Lyle H. Ungar, C. Lee Giles, "Clustering and Identifying Temporal Trends in Document Databases," IEEE Advances in Digital Libraries, ADL 2000, pp. 173-182, IEEE Computer Society, United States.

Ravi Kumar, Prabhakar Raghavan, Sridhar Rajagopalan, Andrew Tomkins, "Trawling the Web for emerging cyber-communities," Proceedings of the 8th International World Wide Web Conference, 1999, pp. 403-415, Elsevier Science B.V., Amsterdam, The Netherlands.

Gary Wiliam Flake, Steve Lawrence, C. Lee Giles, "Efficient Identification of Web Communities," Proceedings of the 6th International Conference on Knowledge Discovery and Data Mining (ACM SIGKDD-2000), 2000, pp. 150-160.

(Continued)

Primary Examiner—Jay A Morrison
Assistant Examiner—Sangwoo Ahn
(74) Attorney, Agent, or Firm—Lee & Hayes, PLLC

(57) ABSTRACT

In community mining based on core objects and affiliated objects, a set of core objects for a community of objects are identified from a plurality of objects. The community is expanded, based on the set of core objects, to include a set of affiliated objects. According to one aspect, a model of a community of objects is obtained by grouping a first collection of a plurality of objects into a center portion, and grouping a second collection of the plurality of objects into one or more concentric portions around the center portion. The groupings of the first and second collections of the objects are identified as the community of objects.

31 Claims, 9 Drawing Sheets

OTHER PUBLICATIONS

Rakesh Agrawal, Tomasz Imielinski, Arun Swami, "Mining Association Rules between Sets of Items in Large Databases," Proceedings of the International Conference on Management of Data (ACM SIGMOD), May 1993, 10 page.

* cited by examiner

140

```
┌─────────────────────────────────────┐
│  IDENTIFY ONE OR MORE CORE SETS OF   │──142
│             OBJECTS                  │
└─────────────────────────────────────┘
                 │
                 ▼
┌─────────────────────────────────────┐
│  CREATE COMMUNITIES WITH THE         │──144
│        IDENTIFIED CORE SETS          │
└─────────────────────────────────────┘
                 │
                 ▼
┌─────────────────────────────────────┐
│  EXPAND EACH CORE SET WITH           │──146
│        AFFILIATED OBJECTS            │
└─────────────────────────────────────┘
                 │
                 ▼
┌─────────────────────────────────────┐
│  PERFORM CORE SET MERGING AND/OR     │──148
│        COMMUNITY MERGING             │
│           (OPTIONAL)                 │
└─────────────────────────────────────┘
                 │
                 ▼
┌─────────────────────────────────────┐
│   OUTPUT ONE OR MORE MINED           │──150
│         COMMUNITIES                  │
└─────────────────────────────────────┘
```

*Fig. 2*

270
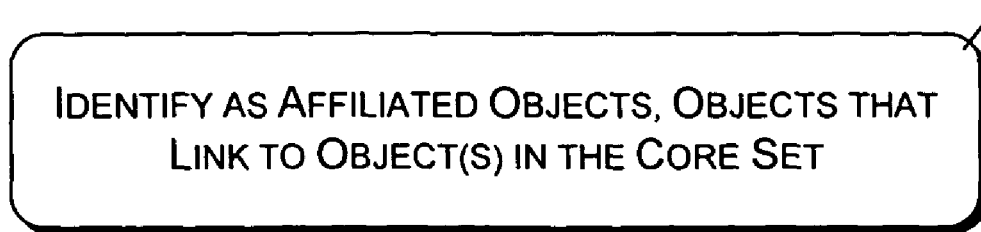
IDENTIFY AS AFFILIATED OBJECTS, OBJECTS THAT LINK TO OBJECT(S) IN THE CORE SET — 272
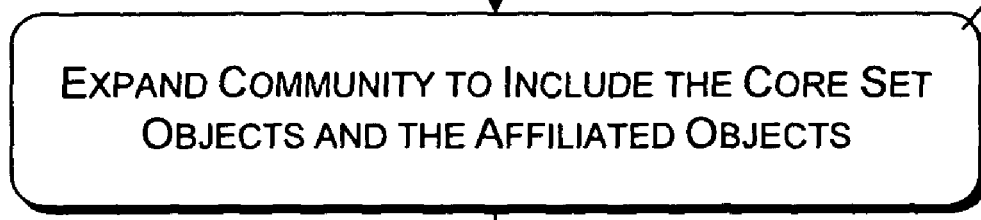
EXPAND COMMUNITY TO INCLUDE THE CORE SET OBJECTS AND THE AFFILIATED OBJECTS — 274
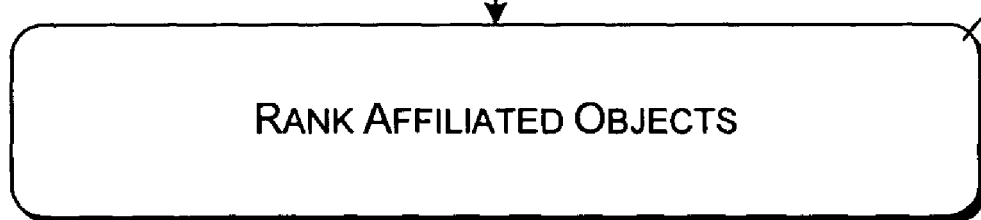
RANK AFFILIATED OBJECTS — 276
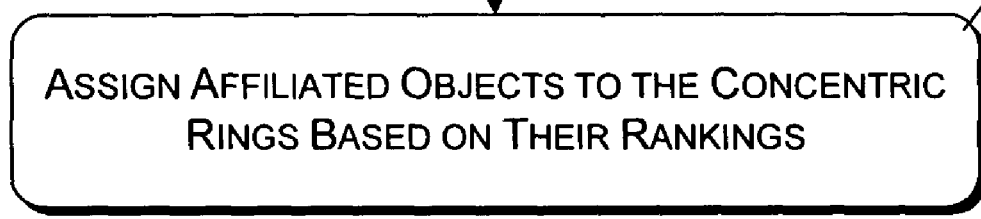
ASSIGN AFFILIATED OBJECTS TO THE CONCENTRIC RINGS BASED ON THEIR RANKINGS — 278
*Fig. 6*

US 7,885,960 B2

COMMUNITY MINING BASED ON CORE OBJECTS AND AFFILIATED OBJECTS

TECHNICAL FIELD

This invention relates to community mining, and particularly to community mining based on core objects and affiliated objects.

BACKGROUND

Discovering related objects from a collection of objects is a very useful capability, particularly when the collection of objects becomes very large. This problem of discovering similar or related objects from a collection of objects is also referred to as community mining. By mining communities of related objects from a large collection of objects, groups of related objects are able to be identified more quickly and easily than when using other methodologies (such as manually scanning all of the objects in the collection).

By way of example, a large number of web pages exists on the Internet. It would be useful to be able to group these web pages together into communities of related web pages, allowing users to quickly and easily view these communities. By way of another example, a database of papers written by researchers may be available. It would be useful to be able to group these papers together into communities of related papers, allowing users to quickly and easily view these communities.

The accuracy of current community mining techniques, however, is lacking. Thus, it would be beneficial to improve on the manner in which community mining is performed.

SUMMARY

Community mining based on core objects and affiliated objects is described herein.

According to one aspect, a set of core objects for a community of objects are identified from a plurality of objects. The community is expanded, based on the set of core objects, to include a set of affiliated objects.

According to another aspect, a model of a community of objects is obtained by grouping a first collection of a plurality of objects into a center portion, and grouping a second collection of the plurality of objects into one or more concentric portions around the center portion. The groupings of the first and second collections of the objects are identified as the community of objects.

BRIEF DESCRIPTION OF THE DRAWINGS

The same numbers are used throughout the document to reference like components and/or features.

FIG. 2 is a flowchart illustrating an example process for community mining.

FIG. 6 is a flowchart illustrating an example process for expanding communities based on core sets of objects.

DETAILED DESCRIPTION

Community mining based on core objects and affiliated objects is described herein. Sets of core objects are identified from a collection of objects, and these sets of core objects are used as a basis for expansion and identification of affiliated objects. A set of core objects and its affiliated objects collectively represent a community. The affiliated objects can further be ranked in accordance with how related they are to the set of core objects in the community. In one aspect, a concentric circle model of the community is defined, with the set of core objects being in the center of the concentric circle model, and each concentric circle surrounding the center including affiliated objects having the same rank.

Figure 1:
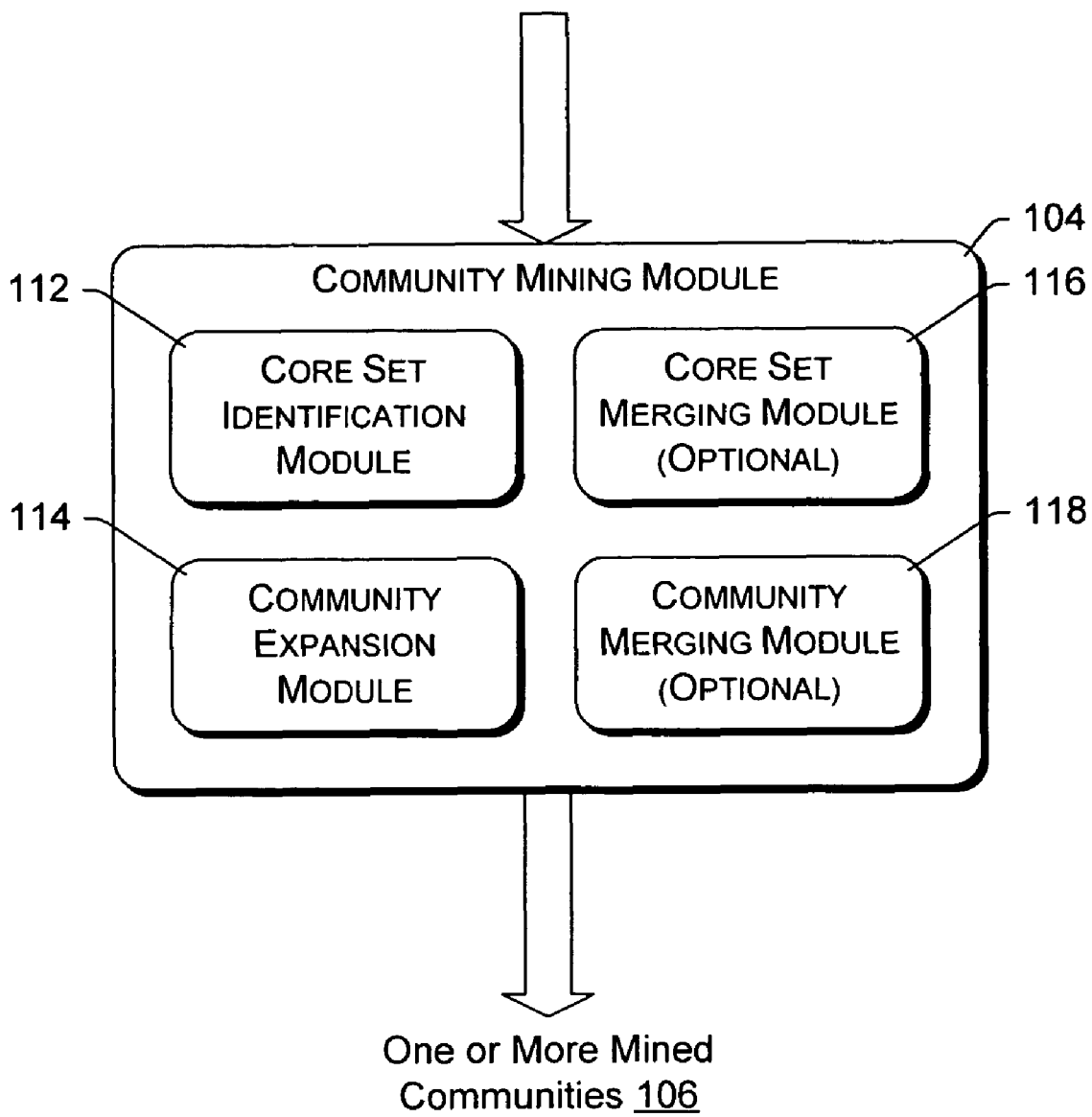
FIG. 1 illustrates an example environment in which the community mining described herein can be implemented.

FIG. 1 illustrates an example environment 100 in which the community mining described herein can be implemented. An object collection description 102 is accessible to a community mining module 104. Once description 102 is accessed, community mining module 104 discovers one or more communities from the described collection of objects 102, and outputs the one or more discovered communities 106.

Description 102 can be made accessible to module 104 in a variety of different manners. For example, description 102 may be passed to module 104, or module 104 may be made aware of the location of description 102 (e.g., in a database) and retrieve description 102 from that location. Alternatively, the objects of the collection themselves may be passed to or retrieved by module 104 and module 104 may generate the description.

Communities of related objects are automatically discovered by community mining module 104. Communities can be mined for any of a wide variety of types of objects by module 104. Examples of such types of objects include people, documents, web pages, and so forth. The number of communities mined from a collection of objects can vary based on the design of module 104 as well as the particular objects in the collection, as discussed in more detail below.

The object collection description 102 describes the collection of objects and the relationships (also referred to herein as links) between the objects. The description 102 can be thought of as a graph with multiple nodes and lines connecting some of the nodes. Each node of the graph represents an object in the collection, and each line between two nodes in the graph represents a relationship between the two nodes of the graph.

The exact nature of the link between two objects depends on the type of objects. For example if the objects are people then the link between objects can be a social relationship between the people (e.g., the two people are friends or acquaintances, the two people are related to one another (e.g., part of the same family by blood or by some legal means such as marriage or adoption), the two people are co-workers, etc.). By way of another example, if the objects are documents, then the link between objects can be a citation of one document in the other. By way of yet another example, if the objects are web pages, then the link between objects can be a hyperlink to one document being included in the other document.

References are made herein to one object being linked to another object. When a first object is linked to a second object, then that first object has a relationship with the second object (e.g., if the objects are documents then the first object may have a citation to the second object; if the objects are web pages then the first object may have a hyperlink to the second object). Thus, for example, if a particular document is cited by three other documents, then each of those other three documents is linked to that particular document.

The links between objects can also be assigned weights, or mapped to a numeric value in other words, to identify the difference among links. Various mapping functions (e.g., a 0/1 function, a reciprocal function, etc.) could be defined and used to represent such differences. The difference among links can be the result of the difference among objects, or among the relationship definition itself. For example, assume that document A is cited by an important document B which is cited by numerous documents. Further assume that document A is also cited by a not so important document C which is cited by no other documents. The citation relationship, or the link, between A and B could be assigned a higher value than that of the link between A and C. Another example is in a social network. The marriage of two persons could be mapped to a higher value than the co-worker relationship, thus representing the difference between close degree of the human relationship.

It should also be noted that the link between two objects can be a direct link or an indirect link. A direct link refers to the situation where no other objects being situated in the path between the two objects. An indirect link refers to the situation where one or more other objects are situated in the path between two objects (e.g., if there's a direct link from object A to object B, and a direct link from object B to object C, then there is also an indirect link from object A to object C (with object B being situated in the path from object A to object C)). References herein to links can refer to direct links and/or indirect links (which links are to be used can vary by implementation as desired by the designer or user of community mining module 104 and/or the generator of object collection description 102).

The description 102 of the object collection and the relationships between objects in the collection may be generated by another device or component and passed to (or otherwise made available to) community mining module 104, or alternatively may be generated by module 104. The manner in which the relationships between objects in a collection are determined can vary based on the type of objects in the collection. For example, if the objects are people then the links between people can be determined based on information collected from the people (e.g., via questionnaires, registration processes, publicly available information, etc.), or by analyzing people's personal web pages to identify references to other people's web pages; if the objects are web pages then the links between web pages can be determined by searching each web page for hyperlinks to other web pages; and if the objects are documents then the links between documents can be determined by searching each document for citations to other documents.

Community mining module 104 uses the description of the collection of objects and the links between the objects to discover the communities within the collection of objects. Community mining module 104 includes a core set identification module 112, a community expansion module 114, an optional core set merging module 116, and an optional community merging module 118.

Core set identification module 112 identifies groups or sets of core objects for communities. The core objects for a particular community are collectively referred to as a core object set and as the core object set for that particular community. These core objects are typically objects that are linked to by large numbers of other objects (e.g., documents that are frequently cited by other documents, or web pages that are frequently hyperlinked to by other web pages). The core objects serve as the core or center of a community.

Community expansion module 114 expands the communities with additional objects, referred to as affiliated objects, based on the core objects. In one implementation, each of the affiliated objects in a community is linked to one or more of the core objects in the community.

Core set merging module 116 attempts to merge core sets based on the similarity between the core sets. Situations can arise where two core sets are identified in the collection of objects and, due to the particular links among the objects, the two core sets may be very similar. If there is sufficient overlap or similarity among objects in the core sets, then the two core sets are merged by core set merging module 116, and the two communities having those two core sets become a single community.

Community merging module 118 attempts to merge communities based on the similarity between the objects in the communities. Situations can arise where two communities are discovered in the collection of objects and, due to the particular links among the objects, the two communities may be very similar. If there is sufficient overlap or similarity among objects in the community (core set objects as well as affiliated objects), then the two communities are merged by community merging module 118, and the two communities become a single community.

It should be noted that community mining module 104 can be implemented in any of a variety of manners. For example, module 104 may be implemented on a general purpose computing device, or alternatively on a specialized computing device (e.g., specialized for community mining). Additionally, it is to be appreciated that the different modules 112, 114, 116, and 118 may all be implemented on the same device or alternatively may be distributed across multiple devices, and furthermore that the functionality of the individual modules 112, 114, 116, and/or 118 may also be distributed across multiple devices.

In certain embodiments, the mined communities 106 output by community mining module 104 are defined as a four-tuple <C, A, F. Va>, where C represents the set of core objects, A represents the set of affiliated objects, F represents the affiliation definition function measuring two objects i and j (which will return a positive value if i is affiliated by j, such as a value of 1 if j has a direct link to i and a value of 0 otherwise, or a function defined under a complex weighted graph that if there is a path from j to i, and each link on the path was assigned a weight, the function then returns the reciprocal of the sum of all links' weights on the path), and Va is the importance vector for A to measure the rank of every object in A to the set of core objects C.

FIG. 2 is a flowchart illustrating an example process 140 for community mining. Process 140 is implemented by, for example, community mining module 104 of FIG. 1, and may be performed in software, hardware, firmware, or combinations thereof.

Initially, one or more core sets of objects are identified (act 142). Each core set of objects typically includes two or more objects, although alternatively a core set may include a single object. The core sets are identified by identifying groupings of objects with each object in a grouping being referenced by at least a threshold number of other objects in the collection of objects. Once the core sets of objects are identified, communities are created with the identified core sets (act 144). Each core set of objects identified in act 142 serves as the core or center of a community.

Each community is then expanded, based on the core set of objects of the community, by adding affiliated objects (act 146). Affiliated objects are objects that have a link to one or more of the core set of objects in the community. These affiliated objects may optionally be ranked in terms of importance (e.g., how well each is deemed to relate to the community), as discussed in more detail below.

The communities created by identifying core sets in act 142 and expanding with affiliated objects in act 146 can be further modified by performing core set merging and/or community merging (act 148). This merging is optional. Core set merging allows communities to be merged based on the similarity or overlap of the core objects in the communities, while community merging allows communities to be merged based on the similarity or overlap of all of the objects in the communities. Core set merging and community merging are both discussed in additional detail below.

Once the communities are created and expanded, and optionally merged, the resulting communities are output as the one or more communities mined from the collection of objects (act 150). Additionally, it should be noted that under certain circumstances it is possible that the objects and links between objects are such that no communities can be mined from the collection of objects.

Figure 3:
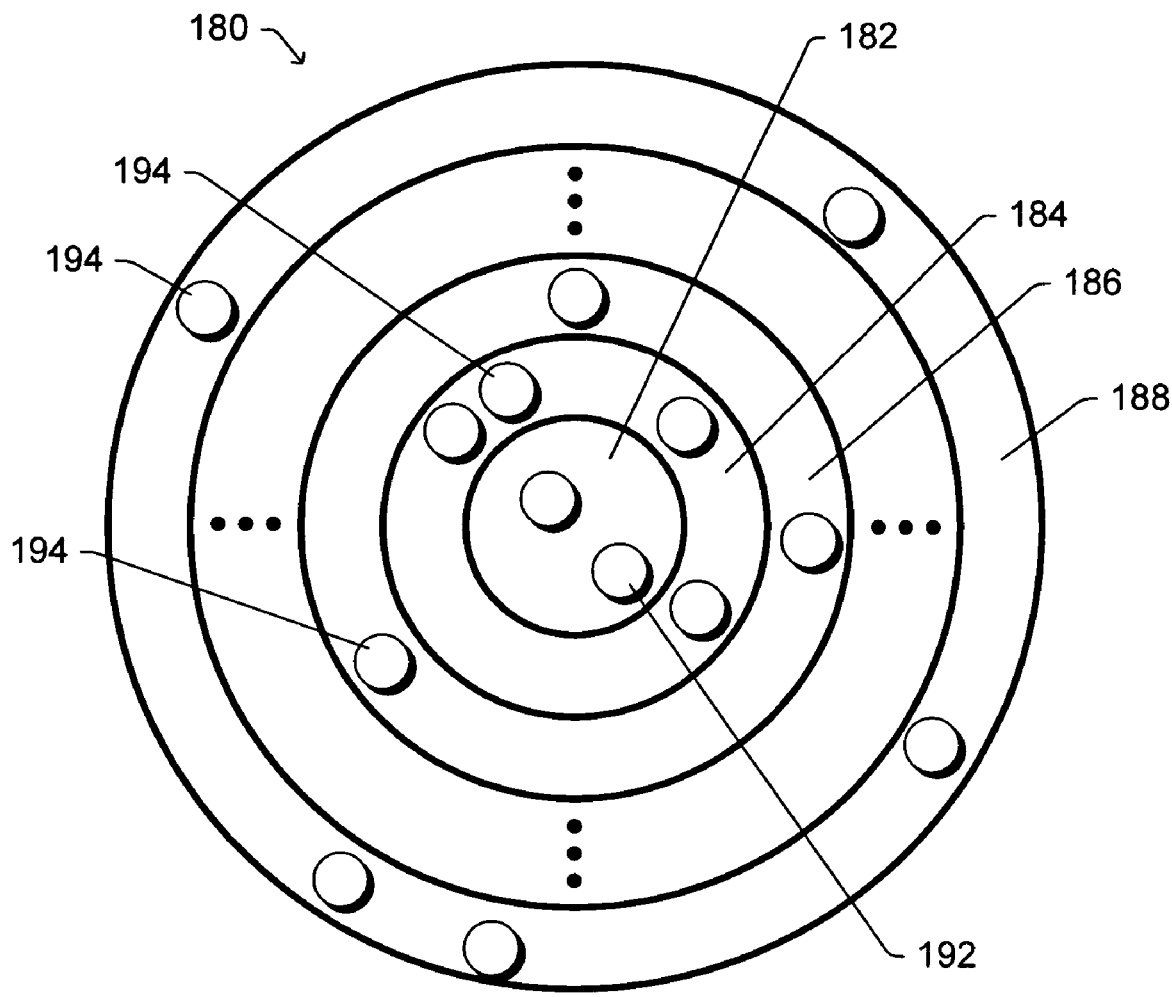
FIG. 3 illustrates an example concentric ring model of a community mined from a collection of objects.

FIG. 3 illustrates an example concentric ring model 180 of a community mined from a collection of objects. The model 180 includes multiple concentric rings 182, 184, 186, and 188. The center ring 182 includes the core objects 192 of the community. The other objects illustrated in model 180 are affiliated objects 194, located in the various rings 184, 186, and 188 that are around the center ring 182. Any number of rings can be included in the concentric ring model 180 (e.g., as indicated by the ellipses between rings 186 and 188).

As can be readily seen from concentric ring model 180, the objects that are deemed to be most important for the community are located in the center ring 182. Other objects that are part of the community but that are deemed to be less important are located in the various concentric rings 184, 186, and 188 surrounding center ring 182, with the objects that are located in rings closer to center ring 182 deemed as being more important than rings located further from center ring 182. Objects located in the same ring have the same importance level to the community. Although the precise location of objects within the ring may reveal a tiny variance in their importance to the community, they are deemed to be the same from a macroscopical viewpoint.

In FIG. 3, the concentric rings are illustrated as circles. However, it should be noted that the concentric ring model can be made up of concentric portions of other geometric shapes as well (e.g., elliptical shapes, triangles, rectangles, pentagons, etc.). Additionally, it should be noted that although the rings are referred to herein as being concentric, the various rings may have the same center or approximately the same center (that is, the rings need not have exactly the same center).

It should also be noted that, rather than viewing the community as a concentric ring model, other models may alternatively be used. For example, a layered or stacked model may be used, with the core objects being at the bottom (or top) of the stack and the affiliated objects being in higher (or lower) layers of the stack.

Figure 4:
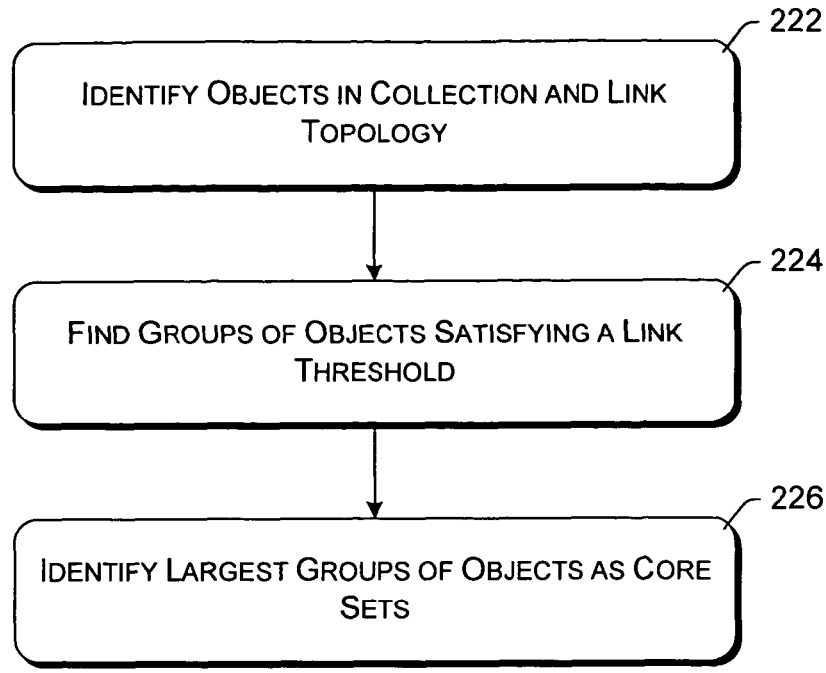
FIG. 4 is a flowchart illustrating an example process for finding core sets of objects.

FIG. 4 is a flowchart illustrating an example process 220 for finding core sets of objects. Process 220 is implemented by, for example, core set identification module 112 of FIG. 1, and may be performed in software, hardware, firmware, or combinations thereof. Process 220 illustrates an example of act 142 of FIG. 2.

Initially, objects in the collection of objects and the link topology of the collection of objects are identified (act 222). The link topology refers to which objects in the collection are linked to which other objects in the collection. Groups of objects that satisfy a link threshold are then identified (act 224). The link threshold represents a minimum number of other objects in the collection that must each link to a particular object in order for that object to be part of the group. Multiple objects which both link to or cite the same other object are also referred to as being co-linked (or co-cited) to that other object. For example, if the objects are documents and the links are cites, and if the link threshold is two, then the document groups are generated such that each document in a particular group is cited by at least the same two other documents in the collection.

Once the groups are found in act 224, the largest groups of objects that are not subsets of another group are identified as the core sets (act 226). It should be noted that different core sets of different sizes can be mined from the same collection of objects.

Figure 5:
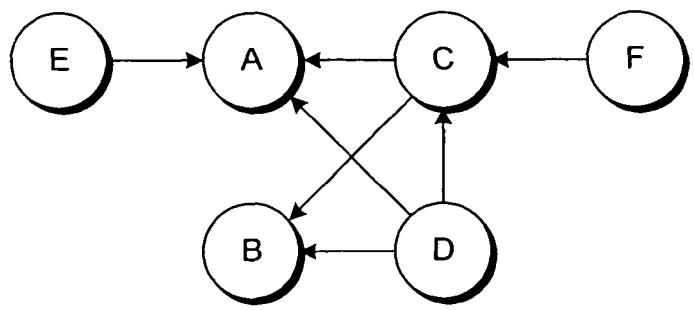
FIG. 5 shows an example that illustrates the process of FIG. 4.

FIG. 5 shows an example that illustrates process 220 of FIG. 4. In the example of FIG. 5, the collection 250 of objects includes six objects (A, B, C, D, E, and F). Typically a collection would include more objects, but FIG. 5 is kept at six for ease of explanation. Further, for ease of explanation assume that each of the objects represents a document, and that the arrows represents links that are cites from one document to another. The direction of the arrow indicates that one document cites another (e.g., document F includes a cite to document C). Thus, it can be seen in FIG. 5 that in the document collection 250: document A does not cite any other document in collection 250; document B does not cite any other document in collection 250; document C cites documents A and B; document D cites documents A, B, and C; document E cites document A; and document F cites document C.

Additionally, assume that in the example of FIG. 5, the link threshold is two. Thus, the groups of objects found in act 224 that satisfy the link threshold of two would be: the group of document A; the group of document B; the group of document C; and the group of documents A and B. Although document C is cited by two other documents (documents D and F), both of these two other documents do not cite document A (and thus no group of documents A and C can be formed), nor do both of these two other documents cite document B (and thus no group of documents B and C can be formed).

Following this example, the group of documents A and B would be a core set but the group of document A would not be a core set and the group of document B would not be a core set (the group of document A is a subset of the group of documents A and B, and the group of document B is a subset of the group of documents A and B). The group of document C would also be a core set (assuming single-object core sets are permitted), as the group of document C is not a subset of the group of documents A and B.

Returning to FIG. 4, the finding of groups of objects in act 224, as well as the identifying of the largest groups in act 226, can be performed in a variety of different manners. In one example implementation, the process is performed by identifying multiple groups of objects that may be core sets, and then refining these multiple groups by searching for larger groups and pruning out subsets of the larger groups. For example, the process may be performed by starting with single-object groups that satisfy the link threshold. These single-object groups are then combined into two-object groups that satisfy the link threshold, and any single-object groups that are subsets of the two-object groups are removed.

This process continues until the largest group(s) of objects is found that satisfies (satisfy) the link threshold. Table I below includes example pseudo code for carrying out this process of acts 224 and 226.

TABLE I

```
1:  Generate 1-itemsets IS1 with minimal support S
2:  k ← 2
3:  while k ≦ m do
4:     Generate k-itemsets ISk using (k-1)-itemsets IS(k-1) with S
5:     Prun IS(k-1) using ISk
6:     k ← k +1
7:  end
8:  Put IS1 to ISm to itemsets set IS
```

In the pseudo code of Table I, the groups of objects are referred to as itemsets, the notation "k-itemsets" refers to groups including k objects, and the minimal support S refers to the link threshold.

As illustrated by the pseudo code of Table I, in line 1 all of the groups with a single object that satisfy the link threshold are identified. The variable k is then incremented to the value of two in line 2, and then a while loop spanning lines 3 through 8 begins. In the while loop of lines 3 through 8, groups of k objects (ISk) are generated by using combinations of the previously generated groups (IS(k-1)) in line 4. All possible combinations of k objects from the objects of the IS(k-1) groups that satisfy the link threshold become groups of k objects (ISk). So, initially with k set to the value of two, groups of two objects are generated by using combinations of the previously generated groups with one object (generated in line 1). The groups generated in line 4 must satisfy the link threshold.

After the new groups are generated in line 4, groups with k-1 objects are pruned in line 5 so that any of the groups with k-1 objects that are subsets of one of the groups with k objects are removed. For example, if a group with document A existed (a 1-object group), and a group with document B existed (also a 1-object group), and a new group is generated with documents A and B (a 2-object group), both of the 1-object groups would be pruned (removed). However, if a group with document C also existed (a 1-object group), then this group would not be pruned because it is not a subset of the 2-object group of documents A and B. This pruning is performed because groups with more objects are more desired than groups with fewer objects.

After pruning, the value of k is incremented by one. This process continues in the while loop of lines 3 through 8 until a value m is reached. This value m represents the longest itemset (the largest size group that satisfies the link threshold). Once a value of k is reached for which no groups can be generated having k objects that satisfy the link threshold, then the value of m is found (the value of m then becomes k-1).

In line 8, the groups remaining when the while loop is exited (once the value of m is hit) become the core sets. This will include at least one group with m objects as well as possibly one or more other groups with fewer than m objects. These different sized groups result because, as seen in the pseudo code of Table I, the process begins with groups having single objects, and groups are removed in line 5 if they are subsets of a larger group, but otherwise they are not removed.

The value of the link threshold can vary by implementation. In one implementation, the value of the link threshold is determined empirically. In another implementation, an initial estimation of the link threshold is determined as follows. Initially, a number of objects from the collection are selected (e.g., randomly or pseudo randomly) to form the objects set R. The number selected can vary, and in one example should be at least 1% of the total number of objects in the collection. The number of objects linked to by each of these selected objects is then identified, and the number of objects that link to each of these selected objects is also identified. The amplified average links of each node can then be used as follows to calculate the value for S (the link threshold):

$$S = \frac{f \times \sum_{R} w_i}{\|R\|}$$

where f represents the amplifying frequency factor (e.g., set to 2 experimentally), $\|R\|$ is the number of selected objects from the collection, and $$\sum_{R} w_i$$

is the weight sum of all links related to R (that is, for any link in the graph, if there is a certain object in R it connects to, then the weight on the link should be added to the sum).

FIG. 6 is a flowchart illustrating an example process 270 for expanding communities based on core sets of objects. Process 270 is implemented by, for example, community expansion module 114 of FIG. 1, and may be performed in software, hardware, firmware, or combinations thereof. Process 270 illustrates an example of act 146 of FIG. 2.

Initially, for a given core set of objects, all other objects in the collection of objects (that is, all other objects in the collection of objects other than the given core set of objects) that link to at least one object in the core set are identified as an affiliated object (act 272). The community having that core set of objects is then expanded to include the core set objects as well as the affiliated objects (act 274).

The affiliated objects are also ranked (act 276). The ranking of a particular affiliated object is determined based on the number of objects in the core set that the affiliated object links to—the larger the number of objects in the core set that the affiliated object links to the higher its ranking is. For example, the affiliated objects that link to all of the core objects may be given a rank of first, the affiliated objects that link to one less than all of the core objects may be given a rank of second, the affiliated objects that link to two less than all of the core objects may be given a rank of third, and so forth. The ranking criteria for affiliated objects can vary, as long as it could be used for sorting the affiliated objects and forming the outer concentric rings 184, 186, and 188.

The affiliated objects are then assigned to particular ones of the concentric rings based on their rankings (act 278). Affiliated objects with higher rankings are assigned to rings closer to the center ring (where the core is located) than those affiliated objects with lower rankings. For example, returning to FIG. 3, affiliated objects with a rank of 1 may be assigned to ring 184, affiliated objects with a rank of 2 may be assigned to ring 186, and so forth.

The ranking of affiliated objects can also be dependent on the weights of the links between the affiliated objects and the objects in the core set. For example, affiliated objects having higher-weighted links to the objects in the core set may be given higher rankings than affiliated objects having lower-weighted links. These link weights may be used to determine the rankings of the affiliated objects, and/or to determine locations of objects within the concentric rings (e.g., affiliated objects having higher-weighted links to the objects in the core set are located closer to the center ring (where the core is located) than affiliated objects having lower-weighted links).

Thus, once the communities are created and expanded, the objects in the communities that are deemed most important can be quickly and easily identified. The most important or core objects are those in the center ring (the core set of objects). With regard to the affiliated objects, the importance of the various affiliated objects can be readily identified based on how close they are to the center ring.

Figure 7:
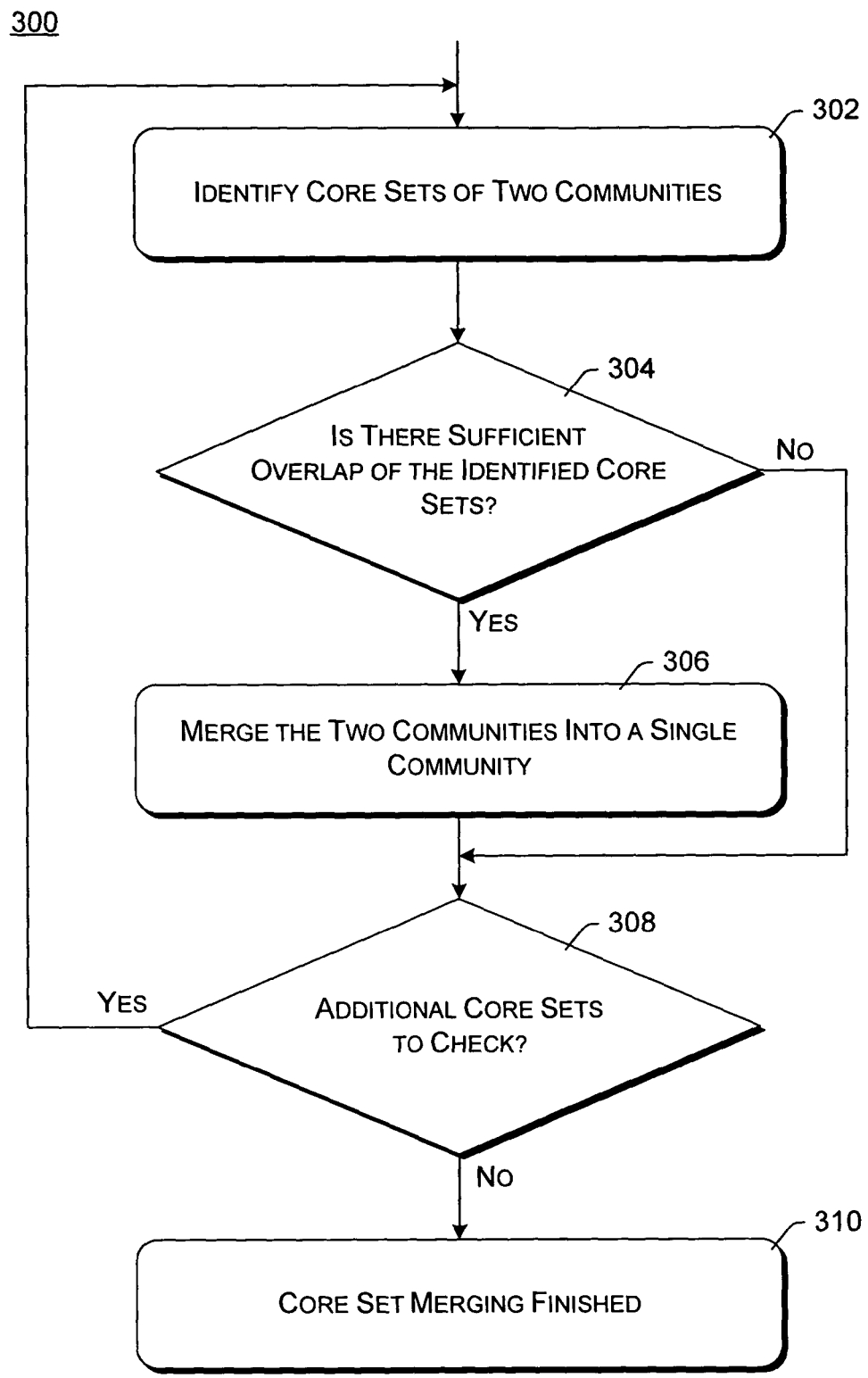
FIG. 7 is a flowchart illustrating an example process for performing core set merging.

FIG. 7 is a flowchart illustrating an example process 300 for performing core set merging. Process 300 is implemented by, for example, core set merging module 116 of FIG. 1, and may be performed in software, hardware, firmware, or combinations thereof. Process 300 illustrates an example of act 148 of FIG. 2.

Initially, core sets of two communities in the collection of objects are identified (act 302). A check is then made as to whether there is sufficient overlap or similarity of the identified core sets (act 304). The check as to whether there is sufficient overlap or similarity of the identified core sets is basically a check to determine whether the two core sets are similar enough that they should be combined into a single core set. Two core sets overlap if there are objects that are included in both core sets. An example of this situation is illustrated in FIG. 8.

Figure 8:
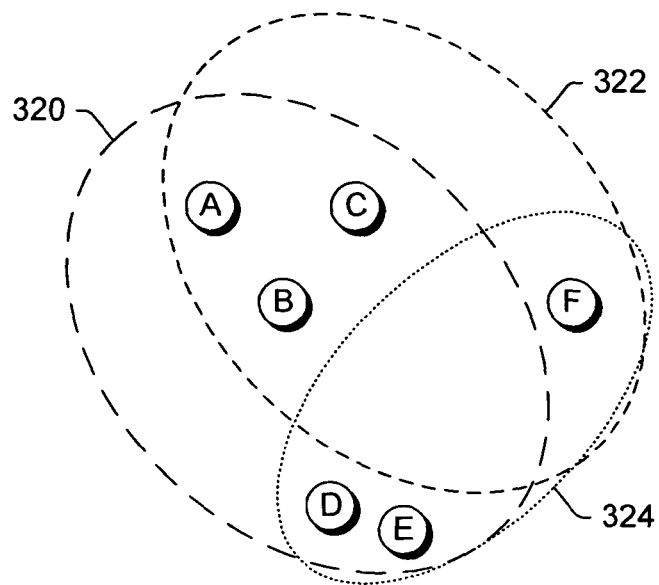
FIG. 8 illustrates an example of core set merging.

In FIG. 8 three core sets of objects are illustrated: core set 320 including objects A, B, C, D, and E; core set 322 including objects A, B, C, and F; and core set 324 including objects D, E, and F. Given the overlapping of these core sets 320, 322, and 324, it may very well be desirable to combine these three core sets 320, 322, and 324 to generate a single core set. Furthermore, even if core set 324 did not exist, it may still be desirable to combine the two core sets 320 and 322.

Returning to FIG. 7, one or more rules (or constraints) are used to determine whether there is sufficient overlap or similarity of two core sets to justify merging the two core sets. In one example implementation, the following three constraints are defined to determine whether two core sets can be merged:

$$\frac{\text{Min}(\|Si\|, \|Sj\|)}{\|Si \cap Sj\|} < 2 \quad (1)$$

$$\exists T \subset \|Si \cup Sj - (Si \cap Sj)\|, \frac{\|Si \cup Sj - (Si \cap Sj)\|}{\|T\|} < 2, \text{Support}(T) \geq S \quad (2)$$

$$\|T\| \geq 2, \exists o_1 \in T \text{ and } o_1 \in (Si-(Si \cap Sj)), \exists o_2 \in T \text{ and } o_2 \in (Sj-(Si \cap Sj)) \quad (3)$$

where Si represents the object set of a core set i, $\|S\|$ represents the number of objects in Si, Sj represents the object set of a core set j, $\|Sj\|$ represents the number of objects in Sj, the Min operation returns the smallest of the values input to the Min operation (e.g., the smallest of $\|S\|$ and $\|Sj\|$), and Support(T) represents the support value of object set T (that is, the largest link threshold that T would satisfy). T is a common subset of both Si and Sj, and the calculated support value of T should also meet the minimal support threshold S (e.g., as referenced above in the pseudo code of Table I). If all three of these constraints are satisfied, then the core set i and the core set j can be merged.

If the two identified core sets can be merged, then the two communities having those two core sets are merged, resulting in a single community (act 306). All of the affiliated objects in the communities of each of the two identified core sets become affiliated objects in the new single community (unless one of the affiliated objects becomes a core object). The rankings for the affiliated objects (if any) may optionally also be re-determined in act 306.

A check is then made as to whether there are any additional core sets to check for merging (act 308). The check is also made if the two identified core sets cannot be merged (from act 304). In one implementation, process 300 checks all combinations of two core sets to determine whether any of the combinations can be merged. When a new community is generated by core set merging, the core set of this new community may also be used as one of the two core sets when checking all of these combinations. If there are additional combinations of core sets to check, then process 300 returns to act 302 where two more core sets are identified. However, if there are no more combinations of core sets to check, then the core set merging is finished (act 310).

It should be noted that, when two core sets are merged using process 300, the link threshold discussed above is no longer satisfied by the merged core set (if it were satisfied, then the merged core set should have been identified in the processes for finding core sets discussed above).

Figure 9:
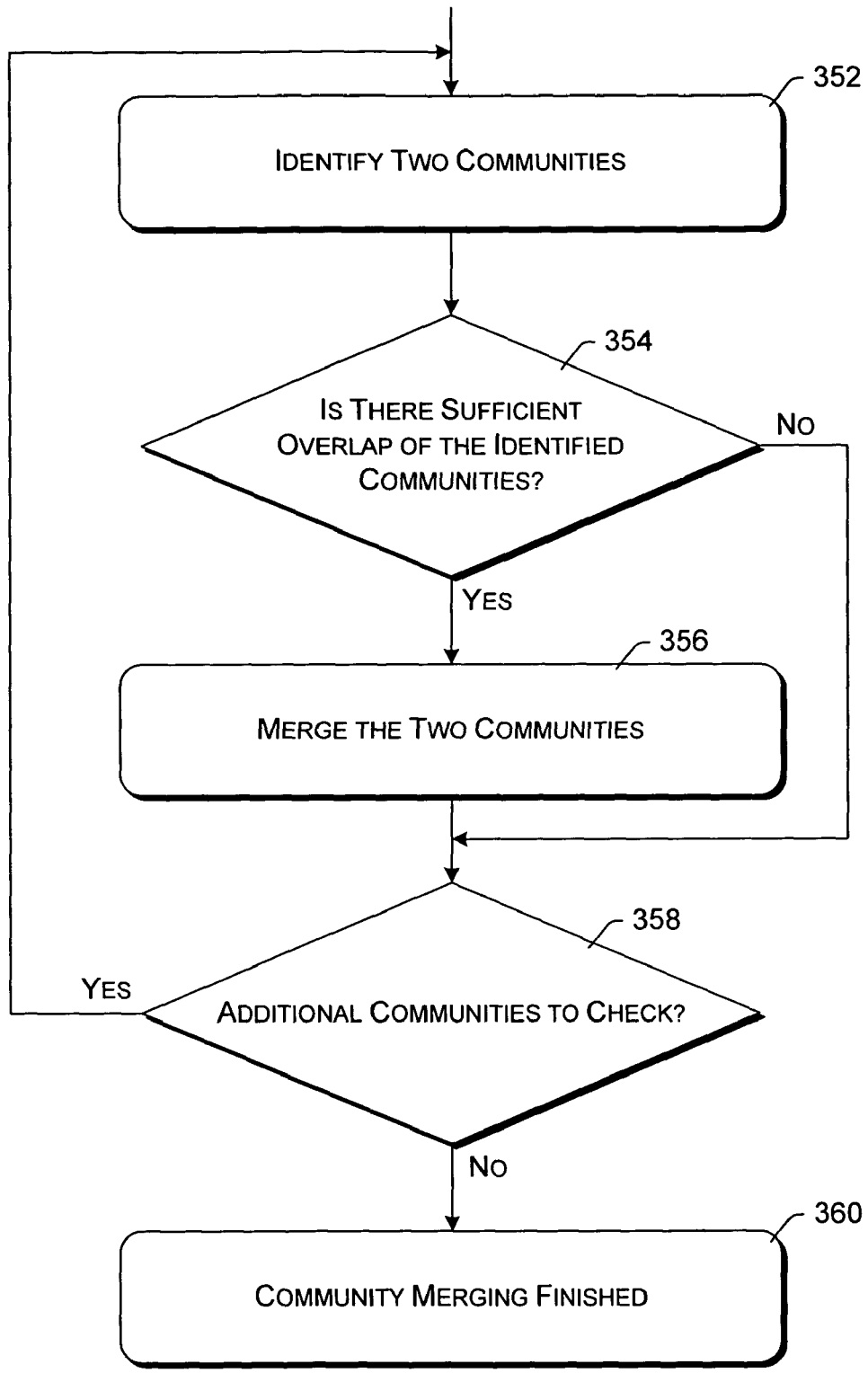
FIG. 9 is a flowchart illustrating an example process for performing community merging.

FIG. 9 is a flowchart illustrating an example process 350 for performing community merging. Process 350 is implemented by, for example, community merging module 118 of FIG. 1, and may be performed in software, hardware, firmware, or combinations thereof. Process 350 illustrates an example of act 148 of FIG. 2.

Initially, two communities in the collection of objects are identified (act 352). A check is then made as to whether there is sufficient overlap or similarity of the identified communities (act 354). The check as to whether there is sufficient overlap or similarity of the identified communities is basically a check to determine whether the two communities are similar enough that they should be combined into a single community, even though their core sets may be different. Two communities overlap if there are objects that are included in both communities. An example of this situation is illustrated in FIG. 10.

Figure 10:
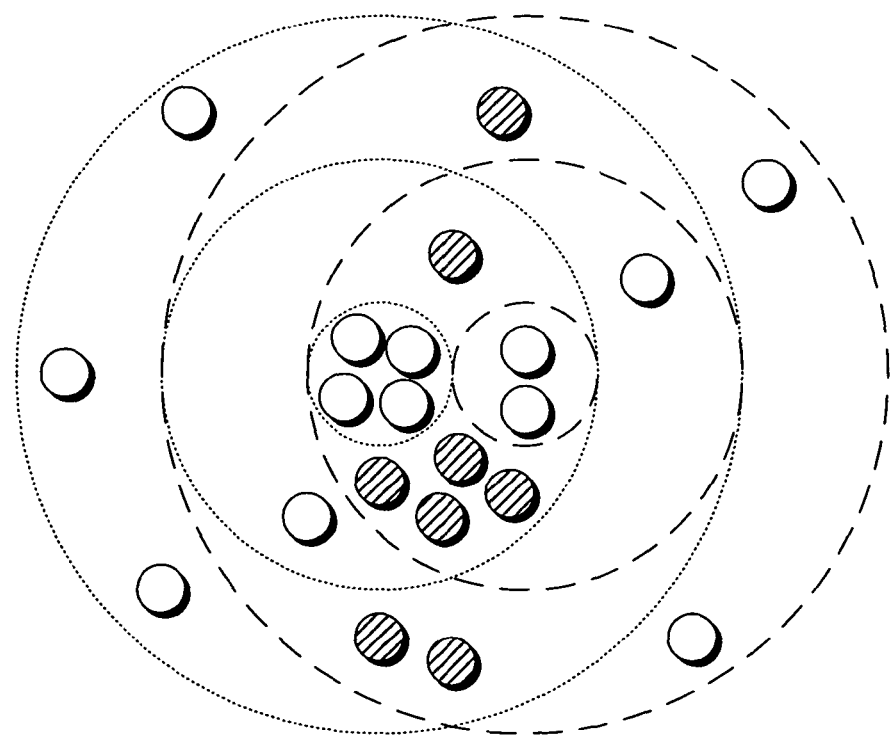
FIG. 10 illustrates an example of community merging.

In FIG. 10 two communities are illustrated. The communities have different core sets, but do have some overlapping affiliate objects. The overlapping affiliate objects are illustrated in FIG. 10 as cross-hatched. Given the overlapping of these two communities, it may very well be desirable to combine the two communities into a single community.

Returning to FIG. 9, one or more rules (or constraints) are used to determine whether there is sufficient overlap or similarity of two communities to justify merging the two communities. In one example implementation, the following constraint is defined to determine whether two communities can be merged:

$$\frac{\text{Min}\left(\sum_{\|ESi\|} w_k, \sum_{\|ESj\|} w_k\right)}{\sum_{\|ESi \cap ESj\|} w_k} < 2$$

where ESi represents the affiliated object set expanded from the core set Si, ESj represents the affiliated object set expanded from the core set Sj, $w_k$ represents the rank of an affiliated object, and the Min operation returns the smallest of the values input to the Min operation.

If the two identified communities can be merged, then the two communities are merged, resulting in a single community (act 356). All of the affiliated objects in the communities of each of the two identified core sets become affiliated objects in the new single community (unless one of the affiliated objects becomes a core object). The rankings for the affiliated objects (if any) may optionally also be redetermined in act 356.

A check is then made as to whether there are any additional communities to check for merging (act 358). The check is also made if the two identified communities cannot be merged (from act 354). In one implementation, process 350 checks all combinations of two communities to determine whether any of the combinations can be merged. When a new community is generated by community merging, this new community may also be used as one of the two communities when checking all of these combinations. If there are additional combinations of communities to check, then process 350 returns to act 352 where two more communities are identified. However, if there are no more combinations of communities to check, then the community merging is finished (act 360).

It should be noted that, analogous to the core set merging discussed above, when two communities are merged using process 350, the link threshold discussed above is no longer satisfied by the core set of the merged community (if it were satisfied, then the merged community should have been identified in the processes for finding core sets discussed above).

It should also be noted that, as can be seen from the description herein, there is no limit as to the number of different communities an object can belong to. For example, an object may be an affiliate object in multiple communities, an object may be an affiliate object in one or more communities and a core object in one or more other communities, an object may be a core object in multiple communities, and so forth.

It should further be noted that, rather than identifying large groups of objects during core set identification (e.g., as discussed above with respect to FIG. 4 and the pseudo code of Table I), small groups of objects may alternatively be identified. For example, the core set identification may simply identify groups with two or three objects as core sets, without attempting to find groups with larger numbers of objects. After these smaller groups are identified as core sets, the core set merging of FIG. 7 and community merging of FIG. 9 can be relied on to merge the communities.

As can be seen from the description herein, the community mining based on core objects and affiliated objects described herein can have several characteristics. Some of these characteristics are as follows:

Core objects and affiliated objects in a community are distinguished. This allows the objects deemed as being most representative of the community (the core objects) to be highlighted and further allows the affiliated objects to be ranked according to their deemed importance to the core objects.

The core of a community is made up of one or more objects. In many situations, the true core of a community is often a combination of multiple objects. By allowing the core to be made up of multiple objects, more coherent communities can be created.

The objects in the core of a community are not required to be tightly linked (there is no requirement as to direct links among the objects in the core). In fact, it is possible for none of the objects in the core set of a community to directly link to other objects in the core set of the community.

Objects are part of a core set of a community based on the links to those objects, not based on how many other objects they may link to.

Each affiliated object is ranked according to how many of the core objects of the community the affiliated object is linked to. The more core objects in a community an affiliated object links to, the better it is deemed to match the topic of the community.

Figure 11:
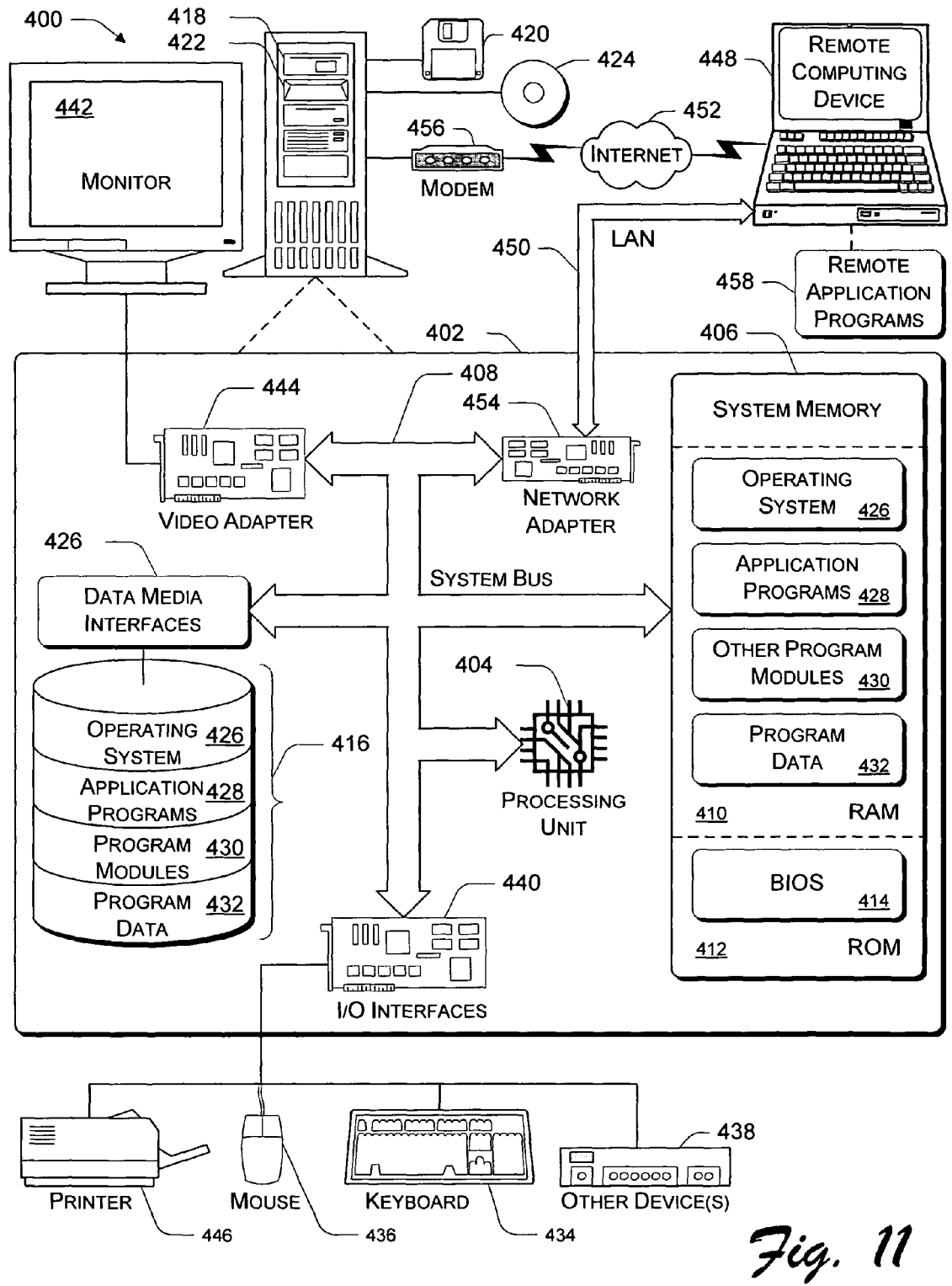
FIG. 11 illustrates a general computer environment.

FIG. 11 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can implement, for example, community mining module 104 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 11 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Various flowcharts are described herein and illustrated in the accompanying Figures. The ordering of acts in these flowcharts are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
by a computer comprising a processor:
identifying, from a plurality of objects, a set of core objects for a data structure corresponding to a community of objects by identifying one or more objects that are referenced by at least a threshold number of other objects of the plurality of objects;

expanding, based on the set of core objects, the community of objects to include a set of affiliated objects, wherein the set of core objects and the set of affiliated objects are maintained as distinct entities within the data structure;

accessing at least one element of the data structure;

assigning the set of core objects to a center portion of a user interface independent model;

assigning each affiliated object in the set of affiliated objects to a particular concentric portion around the center of the model; and merging together a first community of a plurality of communities and a second community of the plurality of communities in response to a finding of similarity between the core objects in the first community and the core objects in the second community, wherein identifying the set of core objects comprises:
  identifying links between objects of the plurality of objects;
  finding groups of objects of the plurality of objects that satisfy a link threshold; and
  identifying, as a set of core objects, one or more of the groups of objects that satisfy the link threshold,
  wherein the link threshold is determined by selecting a number of the plurality of objects that is at least 1 percent of the total number of objects in the plurality of objects and multiplying an amplifying frequency factor by a weight sum of all links and dividing it by the number of the plurality of objects selected.

2. The method as recited in claim 1, further comprising:
repeating the identifying and expanding for a plurality of communities of objects, wherein the objects in each community of objects are all from the plurality of objects.

3. The method as recited in claim 2, wherein the merging results in a merged community including all of the objects of the first community and the second community and having a set of core objects that includes the core objects in the first community and the core objects in the second community.

4. The method as recited in claim 2, further comprising:
merging together a first community of the plurality of communities and a second community of the plurality of communities if there is sufficient similarity between the core and affiliated objects in the first community and the core and affiliated objects in the second community.

5. The method as recited in claim 2, further comprising:
identifying a first community of the plurality of communities and a second community of the plurality of communities;
determining whether the first community and second community satisfy one or more constraints; and
merging the first community and the second community if the one or more constraints are satisfied, wherein the merging results in a merged community including all of the objects of the first community and the second community.

6. The method as recited in claim 2, wherein one of the plurality of objects is one of the set of core objects for the community of objects, and is one of the set of affiliated objects for another community of objects.

7. The method as recited in claim 2, wherein one of the plurality of objects is one of the set of core objects for multiple communities.

8. The method as recited in claim 2, wherein one of the plurality of objects is one of the set of affiliated objects for multiple communities.

9. The method as recited in claim 1, wherein expanding the data structure corresponding to the community of objects comprises:
identifying links between objects of the plurality of objects;
identifying one or more objects of the plurality of objects, wherein a link exists from each of the identified one or more objects to at least one of the core objects of the set of core objects; and
including, in the set of affiliated objects, each of the identified one or more objects.

10. The method as recited in claim 9, wherein a rank is assigned to each affiliated object in the set of objects, the affiliated object being assigned to a particular concentric portion around the center of the model in accordance with the rank of the affiliated object.

11. The method as recited in claim 9, further comprising:
ranking each affiliated object in the set of affiliated objects in accordance with the number of links from the affiliated object to core objects of the set of core objects, wherein affiliated objects having a larger number of links to core objects have higher rankings.

12. The method as recited in claim 1, wherein each of the plurality of objects comprises a document.

13. The method as recited in claim 12, further comprising:
identifying a plurality of links, wherein each link links one object to another object, and wherein each of the plurality of links represents a citation in one document to another document.

14. The method as recited in claim 1, wherein each of the plurality of objects comprises a person.

15. The method as recited in claim 14, further comprising:
identifying a plurality of links, wherein each link links one object to another object, and wherein each of the plurality of links represents a relationship of one person to another person.

16. The method as recited in claim 1, wherein each of the plurality of objects comprises a web page.

17. The method as recited in claim 16, further comprising:
identifying a plurality of links, wherein each link links one object to another object, and wherein each of the plurality of links represents a hyperlink in one web page to another web page.

18. One or more tangible computer-readable storage media having stored thereon a plurality of instructions that, when executed by one or more processors of a device, causes the one or more processors to:
identify, from a plurality of objects, a first collection of objects to be a core of a community;
identify, from the plurality of objects, a second collection of objects that are linked to the first collection of objects wherein the second collection of objects are affiliated objects,
wherein identifying the first collection of objects to be the core of the community comprises:
  identifying links between objects of the plurality of objects;
  finding groups of objects of the plurality of objects that satisfy a link threshold; and
  identifying, as a first collection of objects, one or more of the groups of objects that satisfy the link threshold,
  wherein the link threshold is determined by selecting a number of the plurality of objects that is at least 1 percent of the total number of objects in the plurality of objects and multiply an amplifying frequency factor by a weight sum of all links and dividing it by the number of the plurality of objects selected;

assign the first collection of objects to a center portion of a user interface independent model;

assign each object of the second collection of objects to a particular concentric portion around the center of the model; and add to the community, the second collection of objects, wherein the first collection of objects and the second collection of objects are maintained as distinct entities within a data structure.

19. The one or more tangible computer-readable storage media as recited in claim 18, wherein the plurality of instructions, when executed by the one or more processors, further cause the one or more processors to:

identify, from the plurality of objects, additional first collections of objects to be cores of additional communities;

identify, from the plurality of objects, additional second collections of objects that are linked to the first collections of objects to be affiliated objects of the additional communities;

add, to the additional communities, the respective additional second collections of objects;

add, to structures corresponding to the additional communities, the respective additional second collections of objects; and merge together a first of the communities and a second of the communities in response to a finding of similarity between the core objects in the first of the communities and the core objects in the second of the communities.

20. The one or more tangible computer-readable storage media as recited in claim 19, wherein the merge results in a merged community including all of the objects of the first of the communities and the second of the communities and having a set of core objects that includes the core objects in the first of the communities and the core objects in the second of the communities.

21. The one or more tangible computer-readable storage media as recited in claim 19, wherein the plurality of instructions, when executed by the one or more processors, further cause the one or more processors to:

merge together a first of the communities and a second of the communities if there is sufficient similarity between the core and affiliated objects in the first of the communities and the core and affiliated objects in the second of the communities.

22. The one or more tangible computer-readable storage media as recited in claim 19, wherein the link threshold comprises a minimum number of objects in the plurality of objects that must each link to each object in the group.

23. The one or more tangible computer-readable storage media as recited in claim 18, wherein a rank is assigned to each object in the second collection of objects, based on which object in the second collection of objects is assigned to a particular concentric portion around the center of the model.

24. A system to mine communities from a plurality of objects, the system comprising:

a processor; and a memory coupled to the processor, wherein the memory includes one or more instructions that cause the processor to, at least:

identify one or more core object sets from the plurality of objects by identifying one or more objects that are referenced by at least a threshold number of other objects of the plurality of objects, wherein each core object set is incorporated into a respective data structure defining a community; and for each of the core object sets, expand the respective data structure defining the community to include a set of affiliated objects, wherein the expansion is based on the core object set of the community, and the core object set and the set of affiliated objects are maintained as distinct entities within each respective data structure, wherein identifying the one or more core object sets comprises:

identifying links between objects of the plurality of objects;

finding groups of objects of the plurality of objects that satisfy a link threshold; and identifying, as a core object set, one or more of the groups of objects that satisfy the link threshold, wherein the link threshold is determined by selecting a number of the plurality of objects that is at least 1 percent of the total number of objects in the plurality of objects and multiplying an amplifying frequency factor by a weight sum of all links and dividing it by the number of the plurality of objects selected.

25. The system as recited in claim 24, wherein the one or more instructions further cause the processor to:

repeat the identification and expansion for a plurality of communities of objects, wherein the objects in each community of objects are all from the plurality of objects.

26. A system implemented at least in part in a computing device, the system comprising:

a processor;

a core set identification module to identify core sets of objects for data structures corresponding to communities from a plurality of objects by identifying one or more objects that are referenced by at least a threshold number of other objects of the plurality of objects; and a community expansion module to expand the data structures corresponding to the communities by adding sets of affiliated objects to the data structures corresponding to the communities, wherein the expansion is based at least in part on at least one core set of objects, and each core set of objects and each set of affiliated objects are maintained as distinct entities within each respective data structure corresponding to a community; and a core set merging module to merge together a first of the communities and a second of the communities in response to a finding of sufficient similarity between the core objects in the first of the communities and the core objects in the second of the communities, wherein the finding of sufficient similarity is determined when smallest values from the first of the communities and the second of the communities divided by a set that includes all elements that the first and second communities have in common is less than 2.

27. The system as recited in claim 26, wherein the core set identification module is further to:

identify links between objects of the plurality of objects;

find groups of objects of the plurality of objects that satisfy a link threshold; and identify, as a core object set, one or more of the groups of objects that satisfy the link threshold.

28. The system as recited in claim 26, wherein the community expansion module is further to:

identify links between objects of the plurality of object;

for each community, identify one or more objects of the plurality of objects, wherein a link exists from each of the identified one or more objects to at least one of the objects of the core object set of the community; and include, in the set of affiliated objects of the community, each of the identified one or more objects.

29. The system as recited in claim 26, wherein the core set merging module generates a merged community that includes all of the objects of the first of the communities and the second of the communities and has a set of core objects that includes the core objects from the first of the communities and the core objects from the second of the communities.

30. The system as recited in claim 26, further comprising:

a community merging module to merge together a first of the communities and a second of the communities if there is sufficient similarity between the core and affiliated objects of the first of the communities and the core and affiliated objects of the second of the communities.

31. The system as recited in claim 24, wherein:

at least two core object sets are identified from the plurality of objects; and a decision to merge the at least two core object sets is based on a set of conditions comprising a condition specifying that a ratio of a minimum size of one of the at least two core object sets to a size of an intersection of the at least two core object sets is less than 2.

* * * * *